United States Patent Office.

HAYDN M. BAKER, OF WASHINGTON, DISTRICT OF COLUMBIA.

Letters Patent No. 108,088, dated October 11, 1870.

IMPROVEMENT IN PROCESSES FOR THE MANUFACTURE OF CARBONATE OF SODA, HYDRO-CHLORIC ACID, &c.

The Schedule referred to in these Letters Patent and making part of the same

I, HAYDN M. BAKER, of the city of Washington, in the District of Columbia, have invented and discovered a new and useful "Process for the Manufacture of Hydrochloric Acid and Carbonate of Soda or Carbonate of Potassa from Chloride of Sodium or Chloride of Potassium," of which the following is a specification.

It has long been known that vapor of water passed over chloride of sodium in a fused condition effected mutual decomposition of the said chloride of sodium and water, transforming them into caustic soda and hydrochloric acid, but that these reactions could not be made available on account of the volatility of the chloride of sodium in the presence of water at elevated temperatures, and the degree of force and velocity with which the rapid transit of the steam conveyed away the unconverted chloride of sodium to a locality where the temperature is too moderate to induce such decomposition.

Further, that although these changes might be supposed to occur during the transit or flight of the steam and chloride of sodium, yet the very moment the newly-formed soda, hydrochloric acid, and vapors of water attained the locality of a low temperature, the elements which had just been disengaged from each other would now reunite and reproduce the compounds that originally existed.

It is also well to state that silicic acid (and bases that comport themselves like acids at exalted temperatures in the presence of soda and potassa) very much facilitated the desired transformation so far as chemical theories and affinities were concerned, but that intimate contact of the water, chloride of sodium, and silica, or base, could not be secured and maintained a sufficient length of time to accomplish the decomposition of more than four per cent. of the material employed, for the reasons already set forth, namely, the volatility of the alkaline chlorides at high temperatures in the presence of water or steam.

It is the object of this invention to obviate these objections by the employment of hydrates which part with their water only at very elevated temperatures, so that the said water may be applied to the alkaline chlorides at an exalted temperature and in the nascent state.

By the employment of these agencies, namely, the hydrates, the volatilization of all the alkaline chlorides is obviated at the temperatures necessary to effect their decomposition, with, however, the exception of chloride of ammonium.

The hydrates of common occurrence and moderate cost, which retain their water at exalted temperatures are, the hydrated oxides of potassium, sodium, barium, strontium, calcium, magnesium, and aluminum.

The agent I employ for the decomposition of the alkaline chlorides in preference to all others, is the hydrated oxide of aluminum, (alumina,) for the reason that it exerts the behavior of an acid after having surrendered its water, and is then ready to combine with the caustic alkali the moment it is formed, which action is necessary for the protection of the apparatus employed, on account of the destructive influence of caustic alkalies upon clay, glass, iron, or other apparatus.

Alumina is a sufficiently strong acid in the presence of potash and soda at high temperatures to expel carbonic acid from them, but at low heats the reverse is the case, as carbonic acid will displace alumina.

Alumina, in the presence of silicic acid at exalted temperatures, plays the part of a powerful base.

Having now explained the principles upon which the invention depends, I will proceed to describe its practical application.

I first provide myself with a clay retort and suitable condensing apparatus.

The apparatus now generally used will answer the purpose for all commercial uses, but I prefer clay retorts and clay Wolf bottles, for the reason that it gives nearly chemically pure acid and soda as products, and that the hydrochloric acid which comes over does not possess the requisite quantity of water, (being very nearly the anhydrous gas,) and the water can be supplied to it by the Wolf apparatus, besides answering the purposes of condensation.

I now mix chloride of sodium or chloride of potassium with a sufficient quantity of hydrate, bihydrate, or terhydrate of alumina, (oxide of aluminum,) to insure the complete decomposition of the alkaline chloride employed.

I next charge this mixture into the retort, and submit it to a temperature necessary to produce a continuous flow of hydrochloric acid from the retort to the condensing apparatus, where it is absorbed by the water, and is then ready for market. I try to effect this transformation at as low a temperature as possible, to prevent the formation of silicates by the action of the newly-formed alkali from the chloride upon the silica in the clay retort; but I continue to apply the heat as long as the flow of hydrochloric acid is apparent, having in the outset appropriated an abundance of the hydrate of alumina to secure the decomposition of all the chloride.

When the foregoing operation is completed, I withdraw the product of aluminate of soda or aluminate of potassa from the retort, dissolve it in water, and precipitate the hydrate of alumina with carbonic acid, which leaves carbonate of soda or carbonate of potash in solution, depending upon whether alumnitate of soda or aluminate of potash is the subject of decomposition.